United States Patent [19]

Pareja

[11] 4,292,990
[45] Oct. 6, 1981

[54] HIGH PRESSURE UNLOADER VALVE

[75] Inventor: Ramon Pareja, Edina, Minn.

[73] Assignee: Lear Siegler, Inc., Santa Monica, Calif.

[21] Appl. No.: 119,364

[22] Filed: Feb. 7, 1980

[51] Int. Cl.³ .................... F16K 11/00; F16K 31/12
[52] U.S. Cl. ................................................ 137/115
[58] Field of Search .............. 137/115, 119; 417/307, 417/308, 311

[56] References Cited

U.S. PATENT DOCUMENTS

| | | | |
|---|---|---|---|
| 2,639,722 | 5/1953 | Teague, Jr. | |
| 2,952,267 | 9/1960 | Reis | 137/115 |
| 3,524,465 | 8/1970 | Sadler | 137/115 |
| 3,604,446 | 9/1971 | Brooks | 137/115 |
| 3,606,904 | 9/1971 | Taylor | 137/115 X |
| 3,878,864 | 4/1975 | Schurger | 137/115 X |

*Primary Examiner*—William R. Cline
*Attorney, Agent, or Firm*—Orrin M. Haugen; Thomas J. Nikolai

[57] ABSTRACT

An unloader valve for use in high pressure fluid handling systems which includes a valve body having an inlet port, an outlet port and a bypass port. A tubular plunger element is disposed within the housing for axial reciprocal movement, the tubular plunger having apertures formed through its side wall with the aperture communicating with the inlet port and chamber. Affixed to and coaxially aligned with an open end of the plunger is a ball check valve assembly which is disposed in the outlet chamber communicating with the outlet port. Assembled about the tubular plunger are seals and guides which isolate the outlet chamber from the bypass chamber. A poppet valve having a floating seat secured to the plunger is provided for normally isolating the inlet and bypass chambers. A spring housing is secured to the valve body and contains a compression spring which normally urges the plunger in a direction such that the poppet valve is closed. Fluid flow is then from the inlet chamber, through the tubular plunger and through the check valve to the outlet chamber and port. In the event that the fluid handling system with which the unloader valve is used causes a back pressure at the outlet port exceeding a predetermined value, the check valve closes and the plunger assembly moves in a direction against the spring force to open the poppet valve and allow fluid to flow from the inlet chamber to the bypass chamber.

6 Claims, 2 Drawing Figures

HIGH PRESSURE UNLOADER VALVE

BACKGROUND OF THE INVENTION

I. Field of the Invention:

The present invention relates generally to a bypass and unloader valve for use in fluid handling systems, and more specifically to an improved design of such a valve which permits its use over prolonged periods of time in systems involving relatively high fluid pressures.

II. Discussion of the Prior Art:

In my earlier U.S. Pat. No. 4,171,708 there is described a bypass and unloader valve which is designed for use in fluid handling systems in which the discharge of a fluid may be intermittently shut off. In such systems, a pump may be used to deliver liquids at high pressure to one or more outlet nozzles for providing a high pressure spray at a plurality of sites. For example, in a coin operated car wash application, a common pump may be used to deliver water or other chemicals to spray guns located in separate stalls. At any given time, all, less than all or none of the spray guns may be operating and, as such, means must be provided for unloading the liquid to a bypass so that the pump is not subjected to undue back pressure. While the unloader valve of my aforereferenced patent is entirely suitable for fluid handling systems wherein the pressures encountered are relatively low or intermediate, that design is not altogether suitable in systems involving relatively high pressures. For example, it will be noted from my earlier patent that the valve stem or plunger is maintained in tension by a heavy spring element and for the bypass valve to operate, the plunger must be made to move against the force of this spring as the outlet pressure increases. Where high fluid pressures are involved, the force becomes so significant that the plunger member may fail in tension. While this can be avoided by designing a plunger of a large diameter, this necessarily increases the size, weight and cost of the unloader valve. Then too, the cup seal on the piston element secured to the plunger will be extruded between the mating surfaces of the piston and cylinder side walls causing leakage and deteriorated performance which may require frequent repair, depending upon the pressures encountered.

SUMMARY OF THE INVENTION

In accordance with the teachings of the present invention, the aforementioned problems in my earlier invention are obviated through a re-design of the valve housing, the plunger member, the type of spring employed and the manner in which the valves and seals are arranged. More specifically, instead of using a solid rod-like plunger which is maintained in tension by a heavy coil tension spring, in the present invention a tubular, fluid carrying plunger member is involved and somewhat loosely mounted on this plunger is a floating poppet which cooperates with a stationary, chamfered ring seat member mounted within the valve housing. A compression-type spring acting on the plunger normally urges the poppet into a fluid blocking relationship with respect to its seat and also secured to the plunger is a cup seal, anti-extrusion ring and a guide member, these latter elements being disposed between the bypass port and the outlet port. Affixed to one end of the plunger element is a ball check valve assembly which, under normal operation, is urged to an open position by the fluid flowing from the inlet port, through the tubular plunger to thereby cause the fluid to exit from the outlet port. When the outlet port becomes blocked, however, by having a utilization device shut off, the pressure in the outlet chamber increases, seating the ball check valve and applying a differential pressure against the cup seal and guide assembly. This differential pressure works against the compression force of the spring and if the outlet pressure reaches a predetermined magnitude, the poppet valve is opened to permit fluid to flow directly from the inlet port to the bypass port. Because the spring is somewhat linear, the extent of opening of the poppet valve is a funtion of the pressure existing in the outlet port and, accordingly, the bypass/unloader valve can be used to adjust the flow through the remaining utilization devices included in the system. Also, because the pressure acting on the effective area of poppet valve creates a force tending to offset the fluid force applied to the larger effective area of the seal between the bypass and outlet chambers, the valve may use a spring having a significantly lower maximum displacement force parameter than would otherwise be possible.

OBJECTS

It is accordingly a principal object of the present invention to provide an improved bypass unloader valve for use in fluid handling systems where the working pressures encountered are relatively high, e.g., 4,000 psi.

Another object of the invention is to provide an unloader valve wherein the plunger shaft is tubular and acts as a conduit from the valve inlet chamber to the outlet chamber while serving as the support for a movable poppet element as well as the displaceable piston assembly.

A still further object of the invention is to provide a bypass unloader valve having a single ball check member disposed in a fluid sealing relationship with the outlet of a tubular, fluid-carrying valve plunger.

A yet still further object of the invention is to provide a bypass unloader valve in which the plunger member is subjected to compressional forces only and where fluid forces are effectively offset so that lower spring forces are needed for proper operation.

These and other objects and advantages of the invention will become apparent to those skilled in the art from the following detailed descrition of a preferred embodiment when considered in conjunction with the accompanying drawings in which:

DESCRIPTION OF THE PREFERRED EMBODIMENT

Figure 1:
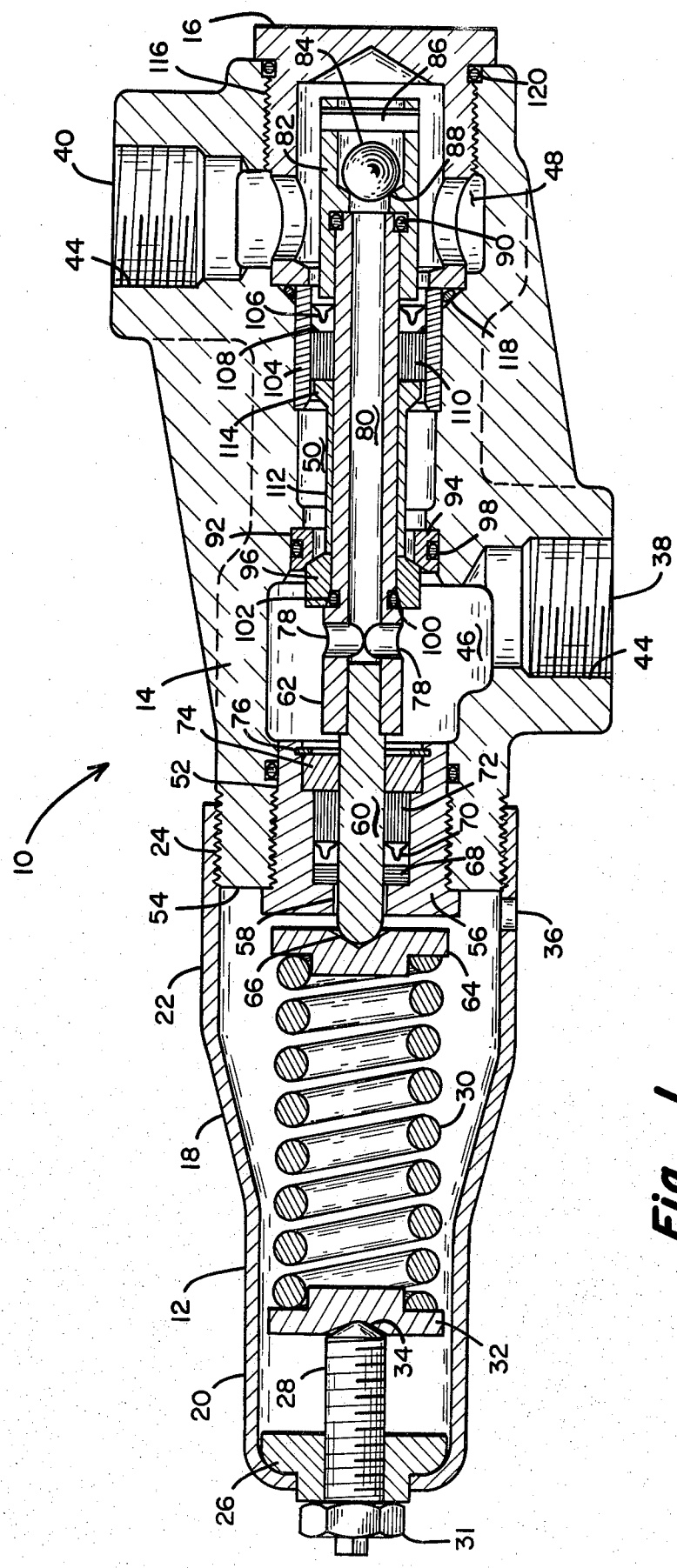
FIG. 1 is a longitudinal cross-sectional view of the preferred embodiment.

Referring first to FIG. 1, there is identified generally by numeral 10 a bypass unloader valve involving the principles of the present invention. The valve comprises a three-piece outer housing including a spring housing 12, the valve body 14 and an end cap 16. The spring housing 12 is generally cylindrical but includes a generally conical tapered midsection 18 integrally joining an end portion 20 of reduced diameter to a portion 22 of larger diameter. The portion 22 is internally threaded as at 24, thereby providing a means whereby the spring housing 12 may be joined to the valve body 14.

Disposed in the end of the spring housing 12 is an internally threaded member 26 for receiving an adjustment screw 28. A lock nut 30 is provided for maintaining the setting of the spring force adjusting screw 28.

The spring itself is identified by numeral 30 and comprises a compression spring which may, for example, provide a spring constant typically in the neighborhood of 1,100 pounds per inch, assuming that the illustrative embodiment of the invention is designed to work in a fluid handling system utilizing pressures around 4,000 psi. However, those skilled in the art will recognize that the spring constant involved is somewhat a function of the operating pressures with which the valve is to be used and therefore, no limitation to any particular spring constant is intended nor should be inferred.

The spring 30 has a cylindrical alignment stud 32 disposed at one end thereof with a portion extending within the coils of the spring to provide a centering action with respect to a conical recess 34 which cooperates with the tapered end of the adjustment screw 28. Also confining the spring 30 to a generally coaxial alignment with the center line of the bypass unloader valve is the inner cylindrical surface of the portion 20 of the spring housing 12. That is, any tendency of the spring 30 to buckle under load will be resisted by its abutment with the inside surface of the portion 20 of the spring housing 12.

As was mentioned above, the spring housing 12 is threadedly secured to the valve body 14 and a port 36 maintains the interior of the housing 12 at atmospheric pressure.

Figure 2:
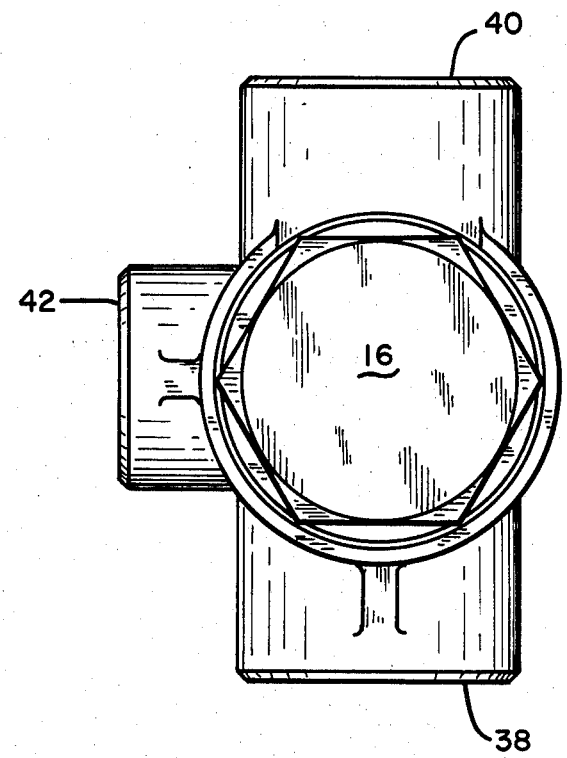
FIG. 2 is an end view illustrating the general orientation of the inlet, outlet and bypass ports of the preferred embodiment.

Before describing the various parts comprising the plunger/piston assembly, the details of construction of the valve body 14 will be set forth. In this regard, the valve body may be formed from a suitable material such as stainless steel and may be either molded or machined. Again, the dimensions of the valve body 14 are dictated to some extent by the operating pressures with which the valve is to be used and, with that in mind, it can be seen that the valve body includes an inlet port 38, an outlet port 40 and a bypass port 42 (see FIG. 2). Each of these ports is internally threaded as at 44 to permit a coupling member (not shown) to be threaded therein for joining the bypass unloader valve to a source of fluid under pressure and to connect same to a utilization device. The bypass port 42 is arranged to be joined by suitable hosing to a reservoir associated with the inlet side of the system's pump (not shown).

The inlet port 38 communicates with an inlet chamber which is identified by numeral 46. In a somewhat similar fashion, the outlet port 40 communicates with an outlet chamber 48 and the bypass port 42 communicates with a bypass chamber 50, each of these chambers being formed internally of the valve body 14.

When viewed as in FIG. 1, the valve body 14 is provided with an axial bore 52 which extends from its left end 54 to the inlet chamber 46. The bore 52 is internally threaded so as to receive the external threads of a bearing cup member 56. The bearing cup 56 has a counterbore formed therethrough, the counterbore being identified by numeral 58. A solid cylindrical stem 60, which is press fitted into the end of a tubular plunger rod 62, extends through the counterbore 58 and abuts a spring retainer element 64 which also includes a tapered recess 66 to provide selfcentering of the spring 30 between its opposed end support provided by the members 32 and 64. To allow reciprocal motion of the stem 60 and the tubular plunger member 62, the bearing cup 56 includes within its axial bore from left to right an anti-extrusion ring 68, a cup seal 70 and a guide sleeve 72. These elements are held in place by a cylindrical spacer 74 which is disposed in a recess in the bearing cup 56, the overall assembly being held together by a snap ring 76. The anti-extrusion ring 68 and the cylindrical guide 72 are preferably formed from powdered graphite mixed with a plastic binder to thereby provide a long-wearing lubricating surface. The cup seal member 70 may be formed from neoprene or some other suitable material. In that the cup seal 70 is exposed to the inlet fluid pressure which may be relatively high (typically 4,000 psi, for example), there would normally be a tendency for the cup seal material to be extruded and deformed. However, by including the anti-extrusion ring 68 with its close sliding fit to the outer surface of the stem 60, such extrusion is precluded.

With continued attention being directed to the cross-sectional view of FIG. 1, it can be seen that there is formed through the side walls of the tubular plunger 62 a plurality of apertures as at 78, those apertures being exposed to the inlet chamber 46. These apertures 78 communicate with the longitudinal bore 80 of the plunger member 62 and the longitudinal bore 80 is open at its rightmost end.

Threadedly secured to the rightmost end of the plunger member 62 is a check valve assembly including a slotted cage 82, a ball check member 84 and a ball retainer pin 86. The cage 82 is machined as at 88 to define a spherically recessed valve seat and an O-ring 90 is disposed between the outer surface of the plunger 62 and the inner surface of the ball check valve cage 82 which serves to prevent leakage between these mating parts. It is to be noted that the ball check valve assembly is disposed within the outlet chamber 48 of the bypass unloader valve 10.

Disposed between the inlet chamber 46 and the bypass chamber 50 in the valve body 14 is a cylindrical recess 92 into which is fitted a poppet valve seat 94 which is generally annular in construction but which has a chamfered recess in one face thereof arranged to cooperate with a mating surface of a floating poppet valve member 96 which, in turn, is loosely mounted upon the tubular plunger 62. An O-ring 98 is disposed in a recess formed in the outer surface of the annular seat member 94, thus normally blocking any fluid leakage between the inlet chamber 46 and the bypass chamber 50.

Examination of the tubular plunger member 62 reveals that it is of a first and large diameter in the zone in which the ports 78 are formed than it is between that zone and the rightmost end to which the ball check valve cage 82 is attached. The shoulder thus formed at the intersection of the large diameter portion with the smaller diameter portion acts as a stop against which the floating poppet member 96 abuts. Here too, an O-ring seal 102 disposed in a recess formed in the plunger, serves as a seal to preclude leakage from the inlet chamber 46 to the bypass chamber 50.

With continued reference to FIG. 1, it can be seen that the inside surface of the valve body 14, just to the right of the bypass chamber 50, is recessed inwardly so as to receive a sleeve member 104 which is generally cylindrical and has an inside diameter which is a predetermined size larger than the outside diameter of the portion of the plunger extending through it. Disposed in the gap between the sleeve 104 and the plunger 62 is a cup seal 106, an anti-extrusion ring 108 and a guide ring 110. A tubular spacer member 112 surrounds the plunger 62 and is of a length which causes it to abut the poppet valve 96 when that valve element abuts its associated seat member 94. The spacer 112 has a forward end which tapers to a substantially larger diameter as at 114 to define an annular face against which the guide ring 110 abuts. The guide ring 110 and the anti-extrusion ring 108 are preferably formed from a powered graphite material in a suitable plastic binder whereby a hard, lubricated sliding surface is maintained between the outside diameter of the guide ring 110 and the inside diameter of the sleeve 104. The anti-extrusion ring 108 precludes the high pressure acting on the neoprene cup seal 106 from causing that material to be extruded and flow into the clearance between the guide ring 110 and the cylinder 104.

Completing the assembly is the end cap 16 which is threadedly secured to the valve body 14 as at 116, the forward edge of the end cap abutting the sleeve 104 and holding it against longitudinal displacement. A O-ring seal 118 is disposed between the front face of the end cap 16 and the valve body 14 in proximity to the abutment of these parts with the sleeve 104. Similarly, a O-ring seal element 120 is fitted within a recess formed at the rightmost end of the valve body 14 to preclude leakage from the high pressure outlet port along the threaded surface 116 to the ambient.

Now that the details of the construction of the bypass unloader valve have been set out in detail, consideration will be given to its mode of operation. In doing so, various structural relationships will be developed.

OPERATION

The bypass unloader valve of the present invention is adapted to be used in fluid handling systems wherein fluids under high pressure from a pump or the like are to be dispensed from one or more utilization devices on an intermittent basis and, in this regard, a coin operated car wash application is most illustrative. In such a system, water or a mixture of water and other chemicals is supplied from a low pressure source such as a municipal water supply and is passed through a suitable pump whereby the liquid pressure is raised to a desired level. By means of suitable plumbing, the high pressure liquid is conveyed to a plurality of car wash stalls, each having a utilization device in the form of a spray gun with on and off flow control means. At any one time, all or less than all of the plurality of spray guns may be in operation. There will also be times when none is in operation.

From the nature of the installation as described above, it can be seen that the pump will be exposed to a range of back pressures, such back pressure being at a minimum when all spray guns are in use and at a maximum when all of the spray guns are off. By incorporating an unloader valve of the type described herein, the discharge may be completely shut off without stopping or interrupting the operation of the pump itself and without subjecting the pump to undue pressures which might otherwise cause it to prematurely fail. By incorporating the bypass feature, a partial bypass may be provided in instances where not all of the spray guns are in use and the discharge is only partially closed or, if the orifice in the outlet becomes restricted so that the full capacity of the pump may not be discharged under normal conditions. In the event of such an occurrence, pressure will increase in the discharge line and the bypass feature of the combined bypass and unloader valve will operate to effect a partial bypass of the liquid being pumped. When the discharge is completely closed, as when all spray guns are off, the unloader functions to completely bypass the entire output of the pump, thus achieving unloading of the entire pump capacity.

In use, then, the output from the pump (not shown) will be coupled by a high pressure hose to the inlet port 38 and the output port 40 will be coupled by way of suitable plumbing to one or more utilization devices such as high pressure spray washer guns. Assuming that all of the spray guns are in use, the spring bias adjustment screw 28 is turned such that the compression spring 30 exerts a sufficient force on the plunger stem 60 to cause the floating poppet valve member 96 to firmly seat against the chamfered surface of the valve seat 94. This setting of the adjustment screw 28 may be locked by turning the nut 30 against the surface of the stud 26. Under the assumed conditions, the high pressure fluid in the inlet chamber 46 passes through the ports 78 formed in the tubular plunger 62 and flows through the longitudinal bore 80 of the plunger so as to displace the ball check 84 from its seat 88 formed in the ball check valve cage member 82. The ball retainer pin 86 precludes the ball check 84 from completely leaving the cage 82. The cage 82 being slotted allows the fluid to flow into the outlet chamber 48 and from there through the outlet port 40 to the various spray washer guns.

Next, let it be assumed that all of the plural utilization devices are shut off and the manner in which the unloading function is accomplished will be explained. With the output flow blocked, the main cup seal 106 will be exposed to higher pressure than is existing in the inlet port, causing the plunger 62 to move against the force of the spring 30. This opens the floating poppet valve 96 from its seat 94 which results in a drop of pressure in the inlet chamber 46. Once the pressure in the inlet chamber drops, the ball check valve 84 will close on its seat, thereby locking the plunger in this position until the outlet pressure is relieved by the opening of the flow control valve of the utilization device (not shown). With the poppet valve open, the incoming fluid from the pump passes from the inlet chamber 46, through the poppet valve and into the bypass chamber 50 and from there it is allowed to pass through the bypass port 42 (FIG. 2) to the inlet side of the pump (not shown).

Because of the unique dimensioning of the various parts, it is possible to employ a bias spring of a substantially lower maximum deflection force than would be required if it were necessary to offset only the force exerted on the surface exposed to the outlet pressure. More specifically, if the area of the circle defined by the outer diameter of the cup seal 106 is referred to as area A, the area of the circle defined by the inside diameter of the poppet valve seat ring 94 is defined as area B, and the cross-sectional area of the stem 60 is defined as area C, then the spring force is set equal to the product of the working pressure and the quantity $(A+C-B)$ or $F_s = p(A+C-B)$. From this relationship it can be seen that because of the disposition of the poppet valve 94–96 between the inlet chamber 46 and the bypass chamber 50 and by having the bypass chamber 50 intermediate the inlet chamber 46 and the outlet chamber 48, it is possible to utilize the normal working pressure of the fluid to offset the force which would otherwise urge the plunger 62 to the left and, accordingly, a spring having a substantially lower maximum deflection force parameter can be employed.

The maximum stroke of the plunger 62 is the distance between the rightmost face of the spacer ring 74 and the left end of the plunger 62. In the full bypass mode, the plunger 62 is arranged to move its full stroke, thereby providing a maximum opening between the inlet chamber 46 and the bypass chamber 50. Now, let it be assumed that less than all of the plural utilization devices are shut off. In this event, the back pressure existing in the outlet chamber 48 will be less than is required to yield a full stroke deflection. As such, the floating poppet valve 96 will be open, but the flow from the inlet chamber to the bypass chamber will be restricted somewhat and the ball check valve 84 will be open. As such, the volume of flow from the outlet port 40 will be reduced to satisfy the demand of the particular utilization devices in use. The bypass unloader valve of the present invention therefore provides a proportional control over the flow volume exiting in the outlet port when fewer than all of the spray guns are in use, the remaining fractional flow being bypassed to the inlet side of the system's pump.

In that the poppet valve member 96 is dimensioned so as to have a predetermined tolerance between its inside diameter and the outside diameter of the plunger 62, it is free to float (within prescribed limits) and thereby seek out a fully seated relationship with its mating chamfered ring 94. The O-ring 100 serves to prevent leakage through the predetermined clearance from the inlet chamber 46 to the bypass chamber 50.

In the design of the present invention, attention has been given to a construction which permits ease of manufacture and subsequent repair. Specifically, by simply removing the end cap 16 and by unscrewing the ball check valve assembly from the end of the plunger rod 62, one can remove the main cup seal 106, the anti-extrusion ring 108 and the cylindrical graphite guide ring 110 for inspection and possible replacement. Next, by unscrewing the spring housing 12 from the valve body 14, the bearing retainer cup 56 may be unscrewed from the valve body allowing the entire plunger to be withdrawn whereby access may be had to the poppet valve assembly and its associated O-ring seals.

Another important feature of the invention is the fact that the force applied to the plunger 62 and the stem 60 are always compressional in nature whereas in prior art designs the plunger has been maintained in tension. As such, in the present design the plunger structure is less subject to failure and can be made from lighter weight, smaller dimensioned parts than would otherwise be required.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different parts and components, and that various modifications, both as to the details and operating procedures can be effected without departing from the scope of the invention itself.

What is claimed is:

1. A bypass/unloader valve comprising:
   (a) a valve body having an inlet port, an outlet port and a bypass port, said inlet port communicating with an inlet chamber formed in said valve body, said outlet port communicating with an outlet chamber formed in said valve body and said bypass port communicating with a bypass chamber formed in said valve body, said inlet, outlet and bypass chambers being generally aligned along the longitudinal axis of said valve body with said bypass chamber being disposed intermediate said inlet and outlet chambers, said valve body including an axially extending bore connecting said chambers;
   (b) a tubular plunger member disposed in said bore and journaled along its length for reciprocal motion therein, said tubular plunger having a radial aperture through its side wall in communication with said inlet chamber and an open end disposed in said outlet chamber;
   (c) a poppet valve carried by said plunger adjacent abutment means and disposed in said axially extending bore which, when closed, isolates said inlet chamber from said bypass chamber;
   (d) an axially displaceable seal assembly concentrically mounted on said tubular plunger for isolating said bypass chamber from said outlet chamber and exposed to the pressure of fluid in said outlet chamber when fluid, under pressure, is introduced through said inlet port into said chamber and made to flow through said radial aperture and said tubular plunger;
   (e) a ball check valve assembly disposed in said outlet chamber and secured to said open end of said tubular plunger for blocking fluid flow through said open end when the pressure in said outlet chamber exceeds that in said inlet chamber;
   (f) means coupling said axially displaceable seal assembly to said poppet valve for urging said poppet valve to an open position when said outlet pressure exceeds a predetermined value; and
   (g) spring means for applying a compressive force to said tubular plunger for urging said poppet valve through said abutment means to its closed position.

2. Apparatus as in claim 1 wherein said spring means comprises:
   (a) a generally cylindrical housing attached to one end of said valve body;
   (b) a compression spring contained in said housing and abutting said plunger for applying a force to said plunger; and
   (c) means for adjusting the magnitude of the force applied by said compression spring to said plunger.

3. Apparatus as in claim 1 wherein said axially displaceable seal assembly comprises:
   (a) a tubular sleeve member disposed in said axial bore to define a cylindrical surface of a predetermined diameter;
   (b) an annular graphite impregnated plastic guide ring having an inside diameter for receiving the outside diameter of said tubular plunger and an outside diameter slidingly received within said cylindrical surface;
   (c) an anti-extrusion ring disposed adjacent to said annular guide ring and abutting said cylindrical surface; and
   (d) a deformable, resilient, plastic cup seal ring with an inside diameter surrounding said tubular plunger and an outside diameter engaging said cylindrical surface and having one side face thereof abutting said annular guide ring, said guide ring, said anti-extrusion ring and said cup seal being held together on said tubular plunger by said ball check valve assembly.

4. Apparatus as in claim 1 wherein said axially extending bore formed in said valve body extends completely through the length dimension thereof.

5. Apparatus as in claim 4 and further including an end cap member secured to one end of said valve body and having a recess therein for containing said ball check valve assembly, said end cap having a pattern of apertures for allowing fluid communication with said outlet chamber.

6. Apparatus as in claim 4 and further including:
(a) a bearing cup threadedly received in one end of said valve body, said bearing cup including an axial bore for allowing an extension of said tubular plunger to pass therethrough and to engage said spring means, said bore in said bearing cup containing in juxtaposed relationship,
  i. an anti-extrusion ring,
  ii. a resilient plastic annular cup seal, and
  iii. an annular guide sleeve; and
(b) said extension of said tubular plunger extending through and being reciprocally journaled by said anti-extrusion ring, said annular cup seal and said annular guide sleeve.

* * * * *